United States Patent [19]
Boylan et al.

[11] Patent Number: 6,011,703
[45] Date of Patent: Jan. 4, 2000

[54] SELF-SYNCHRONIZED GATE DRIVE FOR POWER CONVERTER EMPLOYING SELF-DRIVEN SYNCHRONOUS RECTIFIER AND METHOD OF OPERATION THEREOF

[75] Inventors: Jeffrey J. Boylan, Dallas; Allen F. Rozman, Richardson, both of Tex.

[73] Assignee: Lucent Technologies Inc., Murray Hill, N.J.

[21] Appl. No.: 09/065,807

[22] Filed: Apr. 23, 1998

Related U.S. Application Data

[60] Provisional application No. 60/054,182, Jul. 30, 1997.

[51] Int. Cl.[7] .......................... H02M 3/335; H02M 7/217
[52] U.S. Cl. ............................. 363/21; 363/127; 363/20
[58] Field of Search ............................ 363/21, 20, 127, 363/97, 89

[56] References Cited

U.S. PATENT DOCUMENTS

| | | | |
|---|---|---|---|
| 4,899,271 | 2/1990 | Seiersen | 363/126 |
| 5,144,547 | 9/1998 | Masamoto | 363/127 |
| 5,274,543 | 12/1993 | Loftus, Jr. | 363/127 |
| 5,291,382 | 3/1994 | Cohen | 363/16 |
| 5,303,138 | 4/1994 | Rozman | 363/21 |
| 5,434,768 | 7/1995 | Jitaru et al. | 363/21 |
| 5,502,610 | 3/1996 | Chaney | 361/18 |
| 5,528,482 | 6/1996 | Rozman | 363/21 |
| 5,535,112 | 7/1996 | Lopez et al. | 363/20 |
| 5,541,828 | 7/1996 | Rozman | 363/21 |
| 5,590,032 | 12/1996 | Bowman et al. | 363/15 |
| 5,870,299 | 2/1999 | Rozman | 363/127 |

*Primary Examiner*—Peter S. Wong
*Assistant Examiner*—Rajnikant B. Patel

[57] ABSTRACT

For use with a synchronous rectifier of a power converter, a self-synchronizing drive circuit and a method of driving the synchronous rectifier. In one embodiment, the circuit includes: (1) a drive winding, associated with an isolation transformer of the power converter and coupled to a rectifying switch in the synchronous rectifier, that provides a drive signal based on a voltage in the isolation transformer to a control terminal of the rectifying switch to charge the control terminal synchronously with the voltage, (2) a drive switch, interposed between the drive winding and the control terminal, that periodically resists creation of a negative potential on the control terminal and (3) a discharge device, coupled to the drive winding, that receives the drive signal and discharges the control terminal synchronously with the voltage.

20 Claims, 8 Drawing Sheets

6,011,703

SELF-SYNCHRONIZED GATE DRIVE FOR POWER CONVERTER EMPLOYING SELF-DRIVEN SYNCHRONOUS RECTIFIER AND METHOD OF OPERATION THEREOF

CROSS REFERENCE TO RELATED APPLICATION

This application claims the benefit of U.S. Provisional Application Ser. No. 60/054,182, filed on Jul. 30, 1997, and entitled "Self Synchronized Gate Drive for Power Converters Employing Self Driven Synchronous Rectifiers," commonly assigned with the present invention and incorporated herein by reference.

TECHNICAL FIELD OF THE INVENTION

The present invention is directed, in general, to power converters and, more specifically, to a drive circuit for a synchronous rectifier, a method of operation thereof and a power converter employing the drive circuit.

BACKGROUND OF THE INVENTION

The use of synchronous rectifiers to improve power converter efficiency is well known in the art. Power converters employing synchronous rectifiers, however, are typically more complex than conventional power converters employing diode rectifiers. Synchronous rectifiers typically contain a plurality of rectifying switches. The greater complexity, therefore, stems from the generation of drive signals for driving control terminals of the rectifying switches. Many techniques for driving the control terminals are available in the art. The available techniques may be separated into two broad categories, namely, control driven and self driven.

Control driven techniques generally employ a semiconductor-based control circuit to generate and synchronize the drive signals. The control circuit may include, for example, a Pulse Width Modulation (PWM) control integrated circuit (such as the UC1842 manufactured by Unitrode of Merrimack, N.H.) or a MOSFET driver integrated circuit (such as the TPS2812 manufactured by Texas Instruments of Dallas, Tex.). The drive signals should be properly synchronized, either to power switches on a primary side of an isolation transformer, or to voltages present on secondary windings of the isolation transformer. Proper synchronization of the drive signals is critical, since excessive power dissipation or even destruction of the power converter may result if the rectifying switches are turned on (or off) at an inappropriate time or, alternatively, are turned on simultaneously.

Self driven synchronous rectifiers generally use the secondary windings of the isolation transformer to generate and to synchronize drive signals. One advantage of the self driven technique lies in its inherent simplicity. Another advantage is that the drive signals are self synchronized. Additional circuitry is usually not required to properly synchronize the drive signals with other portions of the power converter.

Examples of power converters employing self driven synchronous rectifiers may be found in U.S. Pat. Nos. 5,303,138 and 5,528,482, entitled, "Low loss Synchronous Rectifier for Application to Clamped Mode Power Converters," by Rozman. Additional examples may be found in U.S. Pat. No. 5,590,032, entitled, "Self Synchronized Drive Circuit for a Synchronous Rectifier in a Clamped-Mode Power Converter", by Bowman, et al.; U.S. Pat. No. 5,274,543, entitled "Zero-Voltage Switching Power Converter with Lossless Synchronous Rectifier Gate Drive," by Loftus; U.S. Pat. No. 5,434,768, "Fixed Frequency Converter Switching at Zero Voltage," by Jitaru, et al.; and U.S. Pat. No. 5,535,112, entitled "DC/DC Conversion Circuit," by Vasquez Lopez, et al. The aforementioned references are incorporated herein by reference.

A conventional active clamp self driven synchronous rectifier power converter typically includes a drive train on a primary side of an isolation transformer. The power converter further includes a synchronous rectifier, consisting of first and second rectifying switches, coupled to first and second secondary windings of the isolation transformer, respectively.

The drive train generally includes power switches coupled to a primary winding of the isolation transformer. The drive train further includes an active clamp circuit that limits a reset voltage across the primary and secondary windings of the isolation transformer during a transformer reset interval. Drive signals to the rectifying switches may, therefore, be substantially free of dead time. By maintaining a substantially constant drive signal to one rectifying switch during the transformer reset interval, the active clamp circuit may increase power converter efficiency. In practice, however, the reset voltage may not be constant, due to variations in component selection and construction.

One disadvantage of the self driven synchronous rectifier power converter is that a potential of the drive signals is substantially proportional to an output voltage of the power converter. Therefore, in applications wherein a low output voltage is required (e.g., an output voltage of 3.3 V or less), the potential may be inadequate to drive the rectifying switches. An additional drive winding on the secondary side of the isolation transformer has been proposed to positively increase the potential of the drive signals. The additional drive winding, however, may cause the potential to be negative as well as positive (with respect to a source voltage of the rectifying switch). Since driving the rectifying switch negative may cause significant power loss, the benefits of the increased potential is mitigated.

Accordingly, what is needed in the art is a drive circuit for a self driven synchronous rectifier power converter that provides the benefits of an additional drive winding (e.g., increased positive potential of the drive signal) that overcomes the deficiencies in the prior art.

SUMMARY OF THE INVENTION

To address the above-discussed deficiencies of the prior art, the present invention provides, for use with a synchronous rectifier of a power converter, a self-synchronizing drive circuit and a method of driving the synchronous rectifier. In one embodiment, the circuit includes: (1) a drive winding, associated with an isolation transformer of the power converter and coupled to a rectifying switch in the synchronous rectifier, that provides a drive signal based on a voltage in the isolation transformer to a control terminal of the rectifying switch to charge the control terminal synchronously with the voltage, (2) a drive switch, interposed between the drive winding and the control terminal, that periodically resists creation of a negative potential on the control terminal and (3) a discharge device, coupled to the drive winding, that receives the drive signal and discharges the control terminal synchronously with the voltage.

The present invention therefore introduces the broad concept of employing a drive winding to increase a positive potential of a drive signal applied to a control terminal of one or more rectifying switches, thus rendering the rectifying switches conductive at an appropriate time in a switching cycle. One or more discharge devices are used to discharge the control terminal of the rectifying switches, thus rendering the rectifying switches nonconductive at an appropriate time in the switching cycle. The discharge device(s) derives essential control and synchronization signals directly from the transformer windings and prevents the control terminal of the rectifying switches from being driven substantially negative during the nonconductive time interval. Further, the self-synchronizing drive circuit of the present invention derives essential drive and synchronization signals directly from the transformer windings, thus obviating the need for a separate control circuit.

In one embodiment of the present invention, the drive switch is a diode. Of course, the use of other devices for the drive switch is well within the broad scope of the present invention.

In one embodiment of the present invention, the drive switch forms a portion of a charge pump interposed between the drive winding and the control terminal. In an advantageous embodiment, the charge pump includes at least one capacitor and at least two diodes. The charge pump may be coupled to the drive winding and to the control terminal of the rectifying switch. The charge pump may thus take advantage of negative potentials on the drive winding by inverting the negative potential and applying it as a positive potential to the control terminal of the rectifying switch at an appropriate time.

In a related embodiment of the present invention, the self-synchronizing drive circuit includes a charge pump that advantageously reduces current flow in an integral body diode of the rectifying switch during the time that the load current is transitioning from one rectifying switch to the other. The charge pump may reduce current flow in the integral body diode by applying a positive drive voltage to a control terminal of the rectifying switch during a switching transition, thus rendering a channel of the rectifying switch conductive during a time when the channel is normally nonconductive.

In one embodiment of the present invention, the drive winding is located on a secondary side of the isolation transformer, of course, the broad scope of the present invention is not limited to such positioning of the drive winding.

In one embodiment of the present invention, the discharge device is a P-channel metal oxide semiconductor field-effect transistor (MOSFET). In an advantageous embodiment, the discharge device has a control terminal connected to the drive winding (possibly through one or more diodes or impedance devices). The discharge device may also connected to a control terminal of the rectifying switch. The discharge device may thus be controlled in a self driven manner to discharge the control terminal of the rectifying switch at the appropriate time. The discharge device may also be used in conjunction with one or more external impedance(s) connected to one or more terminals thereof, or with one or more additional diodes connected to one or more terminals of the discharge device.

In one embodiment of the present invention, the discharge device is a PNP transistor. In an advantageous embodiment, the PNP transistor is controlled in a self driven manner to discharge the control terminal of the rectifying switch at an appropriate time. Of course, the PNP transistor may also be used in combination with the charge pump. Additionally, the PNP transistor may be used in conjunction with a current limiting impedance connected to one or more terminals of the PNP transistor, or with one or more additional diodes or voltage offsetting devices connected to one or more terminals of the PNP transistor.

In one embodiment of the present invention, the drive switch allows the control terminal of the rectifying switch to advantageously charge to about a peak positive voltage applied by the drive winding. In an advantageous embodiment of the present invention, the peak positive voltage applied by the drive winding may be caused by parasitic circuit elements of the power converter, such as a leakage inductance of the transformer.

In various other embodiments of the present invention, the power converter may be selected from the group consisting of a forward converter, a half-bridge converter, a full-bridge converter, a flyback converter and a boost converter. Of course, the broad scope of the present invention is not limited to a particular converter topology.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
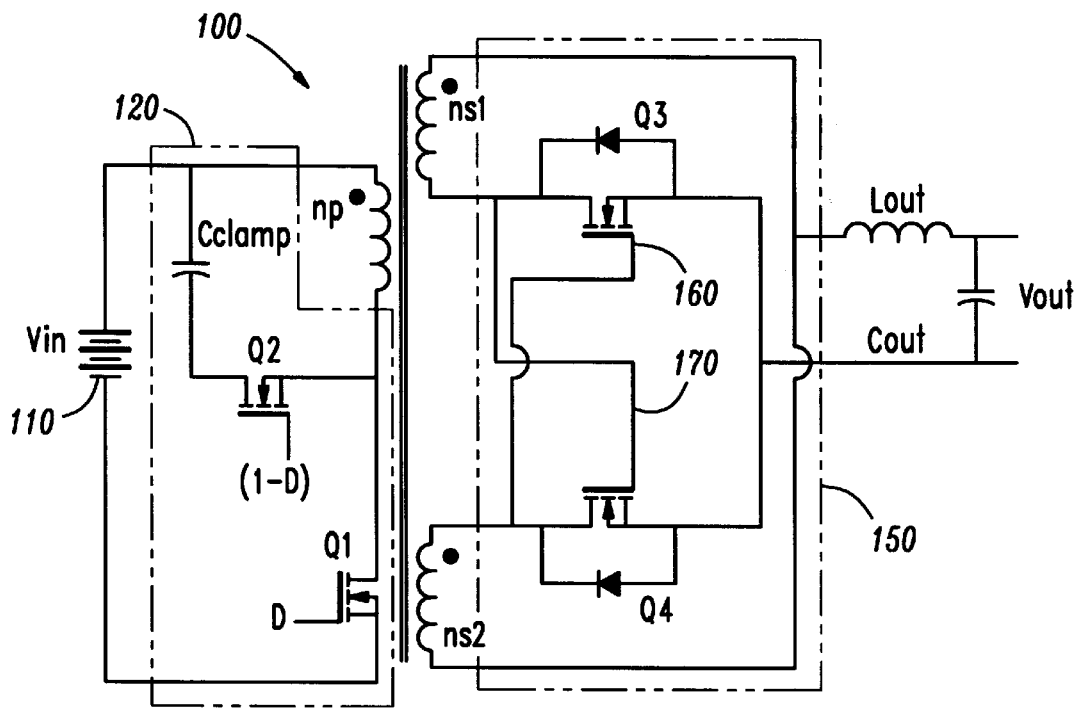
FIG. 1 illustrates an embodiment of a prior art active clamp self driven synchronous rectifier power converter.

Referring initially to FIG. 1, illustrated is an embodiment of a prior art active clamp self driven synchronous rectifier power converter 100. The power converter 100 has an input coupled to a source of input power 110 (with an input voltage Vin) and an output (with an output voltage Vout) couplable to a load (not shown). The power converter 100 includes an isolation transformer having a primary winding np and first and second secondary windings ns1, ns2. The power converter 100 further includes a drive train 120, coupling the input to the primary winding np. In the illustrated embodiment, the drive train 120 consists of main and complementary power switches Q1, Q2 and an active clamp circuit (consisting of a clamp capacitor Cclamp and the complementary power switch Q2). It is well known in the art that the active clamp circuit may be positioned across any winding of the power converter 100. The power converter 100 further includes a synchronous rectifier 150, coupled to the first and second secondary windings ns1, ns2. The power converter 100 still further includes an output inductor Lout and an output capacitor Cout, coupled across the output.

The synchronous rectifier 150 includes first and second rectifying switches Q3, Q4, coupled to the first and second secondary windings ns1, ns2, respectively. A first control terminal 160 of the first rectifying switch Q3 is coupled to the second secondary winding ns2. A second control terminal 170 of the second rectifying switch Q4 is coupled to the first secondary winding ns1. A first gate drive voltage VgsQ3 across the first and second secondary winding ns1, ns2 is used to drive the first rectifying switch Q3. A second gate drive voltage VgsQ4 across the first and second secondary winding ns1, ns2 is used to drive the second rectifying switch Q4. In the illustrated embodiment, the first and second rectifying switches Q3, Q4 are metal oxide semiconductor field-effect transistors (MOSFETs). Those skilled in the art are familiar with the power converter 100, and as a result, an operation thereof will not be described in detail.

The first and second gate drive voltages VgsQ3, VgsQ4 are critical to an efficiency of the power converter 100. Amplitudes of the first and second gate drive voltages VgsQ3, VgsQ4 directly determine channel resistances of the first and second rectifying switches Q3, Q4 during an on state, respectively, and therefore, a power dissipation of the synchronous rectifier 150. During a first time interval D, the first rectifying switch Q3 conducts and the first gate drive voltage VgsQ3 may be represented as:

$$VgsQ3 = Vin \frac{ns1 + ns2}{np}$$

During the first time interval D, the second rectifying switch Q4 is off and the second gate drive voltage VgsQ4 is approximately zero. Then, during a complementary time interval 1-D, the first rectifying switch Q3 turns off and the second rectifying switch Q4 turns on. The first gate drive voltage becomes approximately zero, while the second gate drive voltage VgsQ4 may be represented as:

$$VgsQ4 = \frac{Vout \cdot Vin(ns1 + ns2)}{Vin \cdot (ns1 + ns2) - Vout \cdot np}$$

The second gate drive voltage VgsQ4 is thus proportional to the output voltage Vout. In practice, the first gate drive voltage VgsQ3 is also proportional to the output voltage Vout, since turns ratios of the primary and first and second secondary windings, np, ns1, ns2 are dependent on the output voltage Vout.

MOSFET devices employable as rectifying switches are manufactured by a number of companies (e.g., International Rectifier, Motorola, Siliconix) and are available in a variety of gate threshold voltage configurations (e.g., 2.5 V, 4.5 V and 10 V). The first and second gate drive voltages VgsQ3, VgsQ4 should, therefore, meet the gate threshold voltage to minimize MOSFET channel resistances and thereby decrease the power dissipation of the synchronous rectifier 150. For applications requiring a low output voltage Vout, however, the first and second gate drive voltages VgsQ3, VgsQ4 may not be large enough to drive the first and second rectifying switches Q3, Q4.

Figure 2:
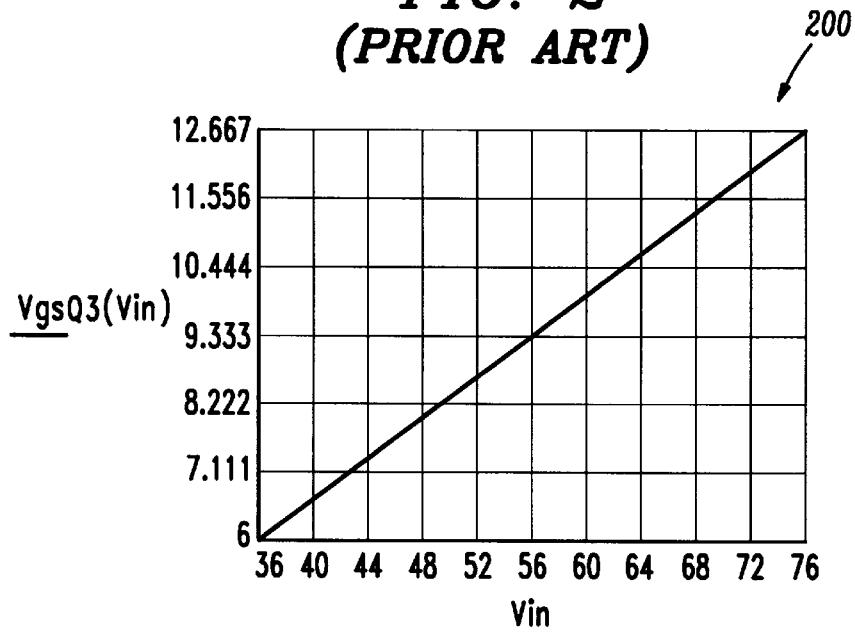
FIG. 2 illustrates an exemplary graph of the first gate drive voltage of the power converter of FIG. 1 during the first time interval.
Figure 3:
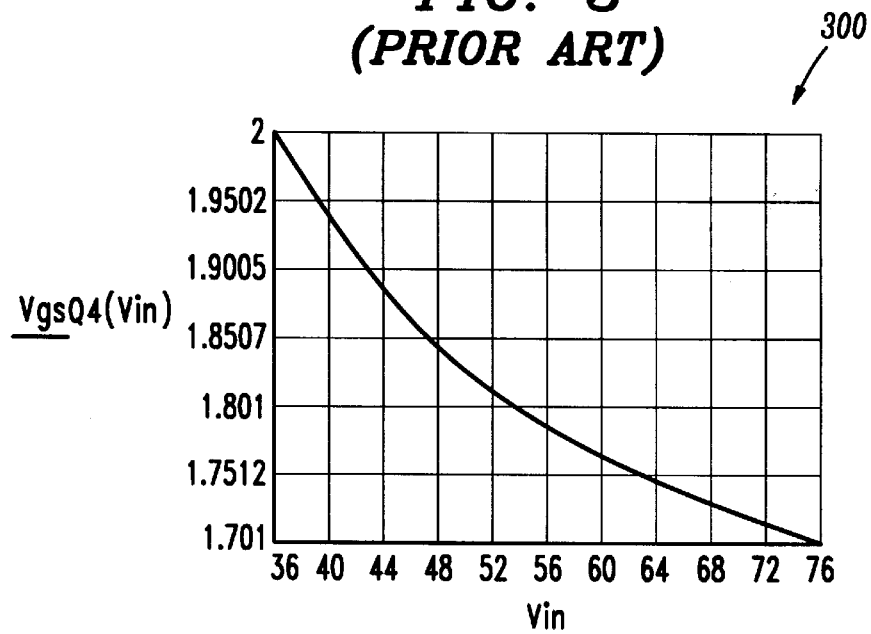
FIG. 3 illustrates an exemplary graph of the second gate drive voltage of the power converter of FIG. 1 during the complementary time interval.

Turning now to FIG. 2, illustrated is an exemplary graph 200 of the first gate drive voltage VgsQ3 of the power converter 100 of FIG. 1 during the first time interval D. Turning also to FIG. 3, illustrated is an exemplary graph 300 of the second gate drive voltage VgsQ4 of the power converter 100 of FIG. 1 during the complementary time interval 1-D. The graphs 200, 300 assume an input voltage Vin ranging from about 36 V to about 76 V; an output voltage Vout of 1.5 V; a primary winding np having 12 turns; and first and second secondary windings ns1, ns2 having 1 turn each. As the graphs 200, 300 illustrate, the first gate drive voltage VgsQ3 (ranging from about 6 V to 12.6 V) may be adequate for available MOSFET devices. The second gate drive voltage VgsQ4 (ranging from 2 V to 1.7 V), however, may be too low to operate the MOSFET devices.

Figure 4:
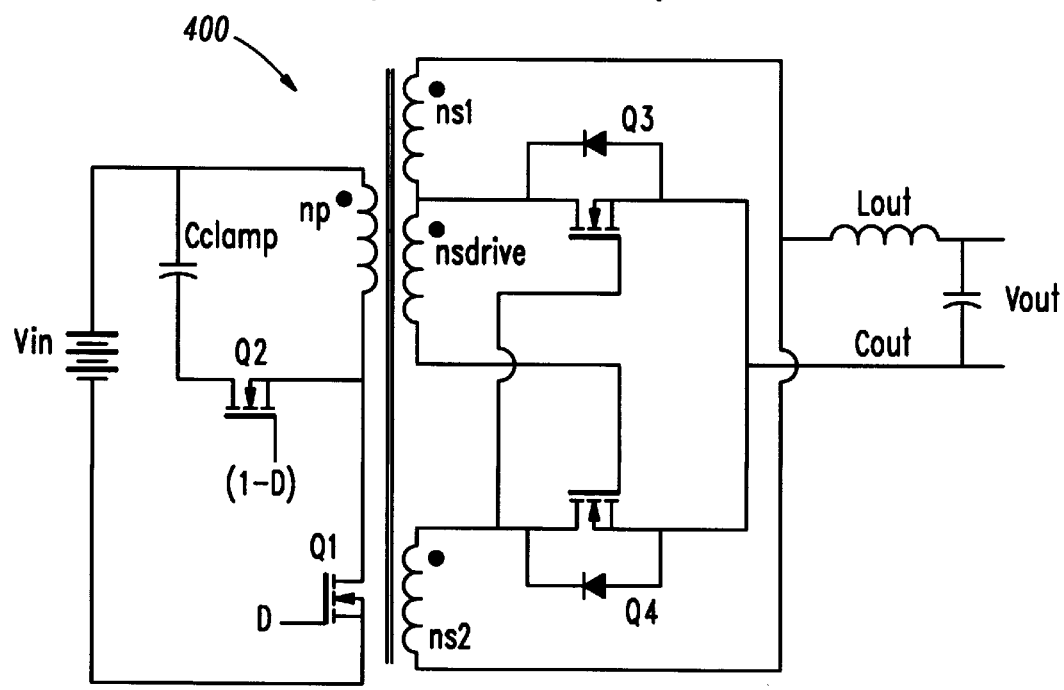
FIG. 4 illustrates an embodiment of another prior art active clamp self driven synchronous rectifier power converter.

Turning now to FIG. 4, illustrated is an embodiment of another prior art active clamp self driven synchronous rectifier power converter 400. The power converter 400 is substantially similar to the power converter 100 of FIG. 1, with the addition of a drive winding nsdrive to boost the second gate drive voltage VgsQ4. In the illustrated embodiment, the drive winding nsdrive is series-coupled to the first secondary winding ns1 and is used to drive the second rectifying switch Q4. Of course, the drive winding nsdrive may also be series-coupled to the second secondary winding ns2 to drive the first rectifying switch Q3.

The first gate drive voltage VgsQ3 (during the first time interval D) is identical to that illustrated with respect to FIG. 1. The second gate drive voltage VgsQ4 (during the complementary time interval 1-D), however, is a function of the drive winding nsdrive, and may be described as follows:

$$VgsQ4 = \frac{Vout \cdot Vin \cdot (ns1 + ns2 + nsdrive)}{Vin \cdot (ns1 + ns2) - Vout \cdot np}$$

The second gate voltage VgsQ4 is positive during a conduction period of the second rectifying switch. During a nonconduction period, however, the second gate voltage VgsQ4 is negative. The negative voltage present during the nonconduction period may be a source of significant loss during switching transitions (e.g., from the first time interval D to the complementary time interval).

Figure 5:
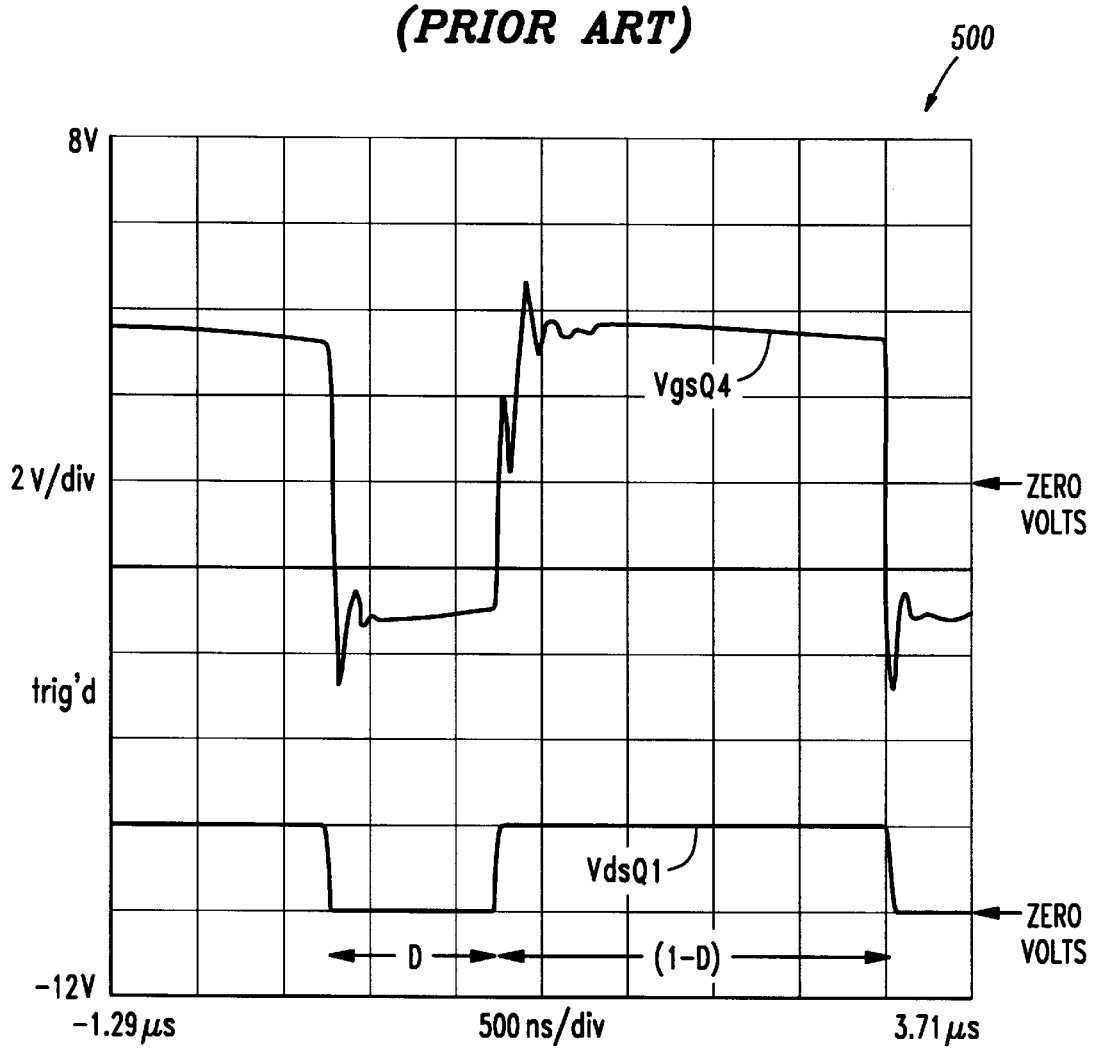
FIG. 5 illustrates an exemplary oscilloscope photograph of the second gate drive voltage and a drain to source voltage of the first power switch of the power converter of FIG. 4.
Figure 6:
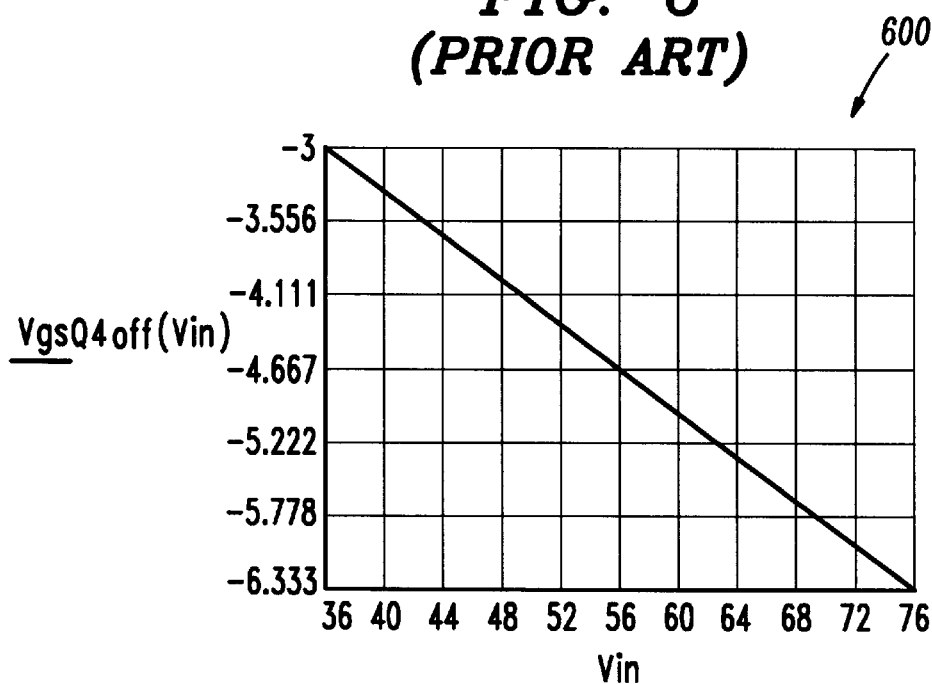
FIG. 6 illustrates an exemplary graph of the second gate drive voltage of the power converter of FIG. 4 during a first time interval wherein the second rectifying switch is not conducting.
Figure 7:
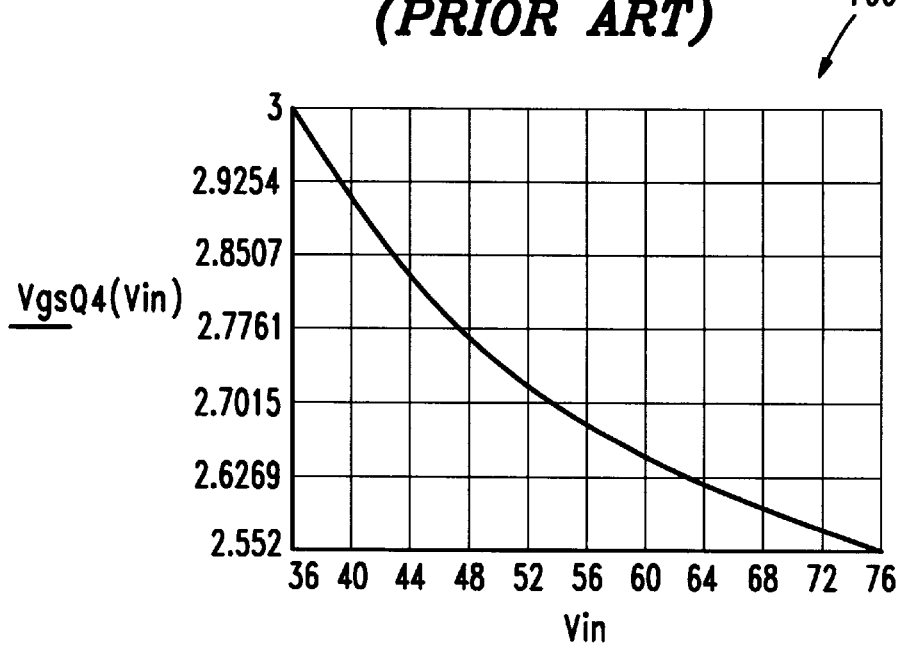
FIG. 7 illustrates an exemplary graph of the second gate drive voltage of the power converter of FIG. 4 during the complementary time interval wherein the second rectifying switch is conducting.

Turning now to FIGS. 5, 6, and 7, illustrated are exemplary graphs 500, 600, 700 of the second gate drive voltage VgsQ4 of the power converter 400 of FIG. 4. More specifically, FIG. 5 illustrates an exemplary oscilloscope photograph 500 of the second gate drive voltage VgsQ4 and a drain to source voltage VdsQ1 of the first power switch Q1. FIG. 6 illustrates an exemplary graph 600 of the second gate drive voltage VgsQ4 during a first time interval D wherein the second rectifying switch Q4 is not conducting. FIG. 7 illustrates an exemplary graph 700 of the second gate drive voltage VgsQ4 during the complementary time interval 1-D wherein the second rectifying switch Q4 is conducting. The graphs 600, 700 assume an input voltage Vin ranging from about 36 V to about 76 V; an output voltage Vout of 1.5 V; a primary winding np having 12 turns; first and second secondary windings ns1, ns2 having one turn each; and a drive winding having one turn.

As the graphs 500, 600, 700 illustrate, the second gate drive voltage VgsQ4 has a negative potential during the first time interval D and a positive potential during the complementary time interval 1-D. The negative potential of the second drive voltage VgsQ4 may cause increased switching losses, thereby reducing an overall efficiency of the power converter 400. Additionally, although the second gate drive voltage VgsQ4 illustrated in FIG. 7 is greater than that illustrated with respect to FIG. 3, those skilled in the art will realize that the positive potential may still be inadequate to properly drive the second rectifying switch Q4. More turns may be added to the drive winding nsdrive to increase the positive potential of the second gate drive voltage VgsQ4.

Figure 8:
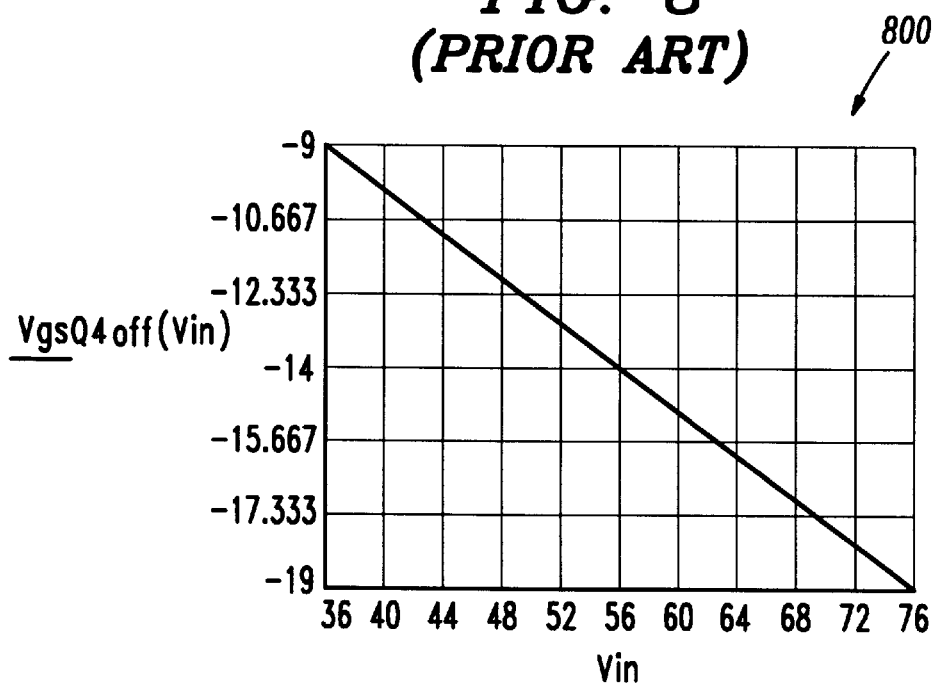
FIG. 8 illustrates an exemplary graph of the second gate drive voltage of the power converter of FIG. 4 during the first time interval wherein the second rectifying switch is not conducting.
Figure 9:
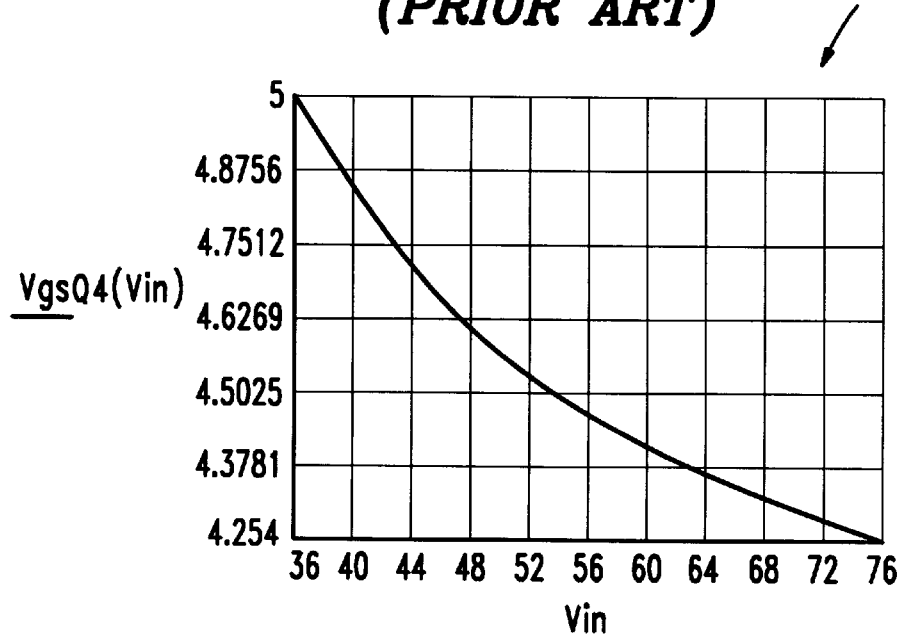
FIG. 9 illustrates an exemplary graph of the second gate drive voltage of the power converter of FIG. 4 during the complementary time interval wherein the second rectifying switch is conducting.

Turning now to FIG. 8, illustrated is an exemplary graph 800 of the second gate drive voltage VgsQ4 of the power converter of FIG. 4 during the first time interval D wherein the second rectifying switch Q4 is not conducting. Turning also to FIG. 9, illustrated is an exemplary graph 900 of the second gate drive voltage VgsQ4 of the power converter of FIG. 4 during the complementary time interval 1-D wherein the second rectifying switch Q4 is conducting. The graphs 800, 900 assume a drive winding nsdrive having three turns. Increasing the number of turns of the drive winding nsdrive from one to three increases the positive potential of the second gate drive voltage VgsQ4 to a range of about 4.2 V to about 5 V depending on the input voltage Vin. The negative potential of the second gate drive voltage VgsQ4, however, is also increased. The increased negative potential may significantly reduce the overall efficiency of the power converter 400 by introducing additional switching losses.

Obviously, increased efficiency is a continuing goal in the design of power converters. One way to increase efficiency is to reduce the negative potential of the second gate drive voltage VgsQ4 during the first time interval D wherein the second rectifying switch Q4 is not conducting.

Figure 10:
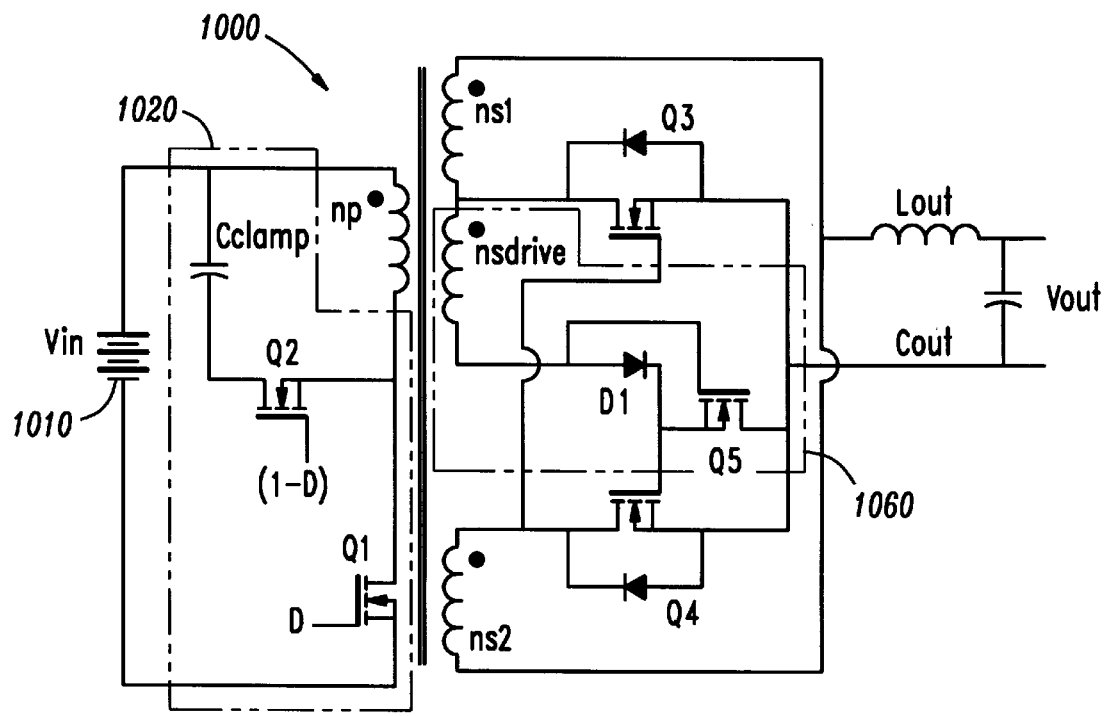
FIG. 10 illustrates an embodiment of a power converter constructed according to the principles of the present invention.

Turning now to FIG. 10, illustrated is an embodiment of a power converter 1000 constructed according to the principles of the present invention. The power converter 1000 has an input coupled to a source of input power 1010 (with an input voltage Vin) and an output (with an output voltage Vout) couplable to a load (not shown). The power converter 1000 includes an isolation transformer having a primary winding np and first and second secondary windings ns1, ns2. The power converter 1000 further includes a drive train 1020, coupled to a primary side of the isolation transformer, that applies input power to the primary winding np. In the illustrated embodiment, the drive train 1020 consists of main and complementary primary side power switches Q1, Q2 and an active clamp circuit (consisting of a clamp capacitor Cclamp). The power converter 1000 further includes a synchronous rectifier, coupled to a secondary side of the isolation transformer. The power converter 1000 further includes a self-synchronizing drive circuit 1060, coupled between the isolation transformer and the synchronous rectifier. The power converter 1000 still further includes an output inductor Lout and an output capacitor Cout, coupled across the output.

In the illustrated embodiment, the synchronous rectifier includes first and second rectifying switches Q3, Q4, coupled to the first and second secondary windings ns1, ns2, respectively. The second secondary winding ns2 is coupled to, and provides a drive signal to a first control terminal of the first rectifying switch Q3. While the first and second rectifier switches Q3, Q4 are illustrated as metal oxide semiconductor field-effect transistors (MOSFETs), those skilled in the art will realize that the use of other types of switching devices is well within the broad scope of the present invention.

The self-synchronizing drive circuit 1060 includes a drive winding nsdrive, associated with the secondary side of the isolation transformer. In the illustrated embodiment of the present invention, the drive winding nsdrive is series-coupled to the first secondary winding ns1 and provides a drive signal based on a voltage in the secondary side of the isolation transformer to a second control terminal of the second rectifying switch Q4. Those skilled in the art will realize that the drive winding nsdrive may also be series-coupled to the second secondary winding ns2 to provide a drive signal to a first control terminal of the first rectifying switch Q3.

The self-synchronizing drive circuit 1060 further includes a drive switch D1, interposed between the drive winding nsdrive and the second control terminal. In the illustrated embodiment, the drive switch D1 is a diode. Of course, other types of switches may also be used.

The self-synchronizing drive circuit 1060 still further includes a discharge device Q5, coupled to the drive winding nsdrive. Those skilled in the art will realize that, while the discharge device Q5 is illustrated as a P-channel metal oxide semiconductor field-effect transistor (MOSFET), the use of other types of discharge devices is well within the scope of the present invention. For example, a PNP transistor, in combination with other additional components, may be used as the discharge device Q5. Those skilled in the art will also realize that additional devices (e.g., resistors, capacitors, diodes, zener diodes) may be used to overcome circuit parasitic effects or to enhance the performance of the power converter 1000.

The self-synchronizing drive circuit 1060 operates as follows. The discharge device Q5 receives the drive signal from the drive winding nsdrive and discharges the second control terminal synchronously with the voltage on the secondary side of the isolation transformer. The discharge device Q5 thus renders a channel of the second rectifying switch Q4 substantially nonconductive during a first time interval D. Of course, body diode current within the second rectifying switch Q4 may continue to flow. The drive switch D1, therefore, periodically resists creation of a negative potential on the second control terminal. By reducing the negative potential during the first time interval D, the drive switch D1 may decrease switching losses associated with the negative potential, thereby increasing an overall efficiency of the power converter 1000.

While the power converter 1000 substantially eliminates the negative potential on the second control terminal, the positive potential is limited to voltage available from the drive winding nsdrive. Additionally, the drive switch D1 may reduce the positive potential, since a voltage drop of the drive switch D1 is subtracted from the available positive potential. In practice, however, parasitic voltage spikes are present on the drive signal. The drive switch D1 may, therefore, peak charge the second control terminal to a potential of the parasitic voltage spike (or some other peak voltage). It may also be advantageous to use both the positive potential and the negative potential available from the drive winding nsdrive, to drive the second control terminal.

Figure 11:
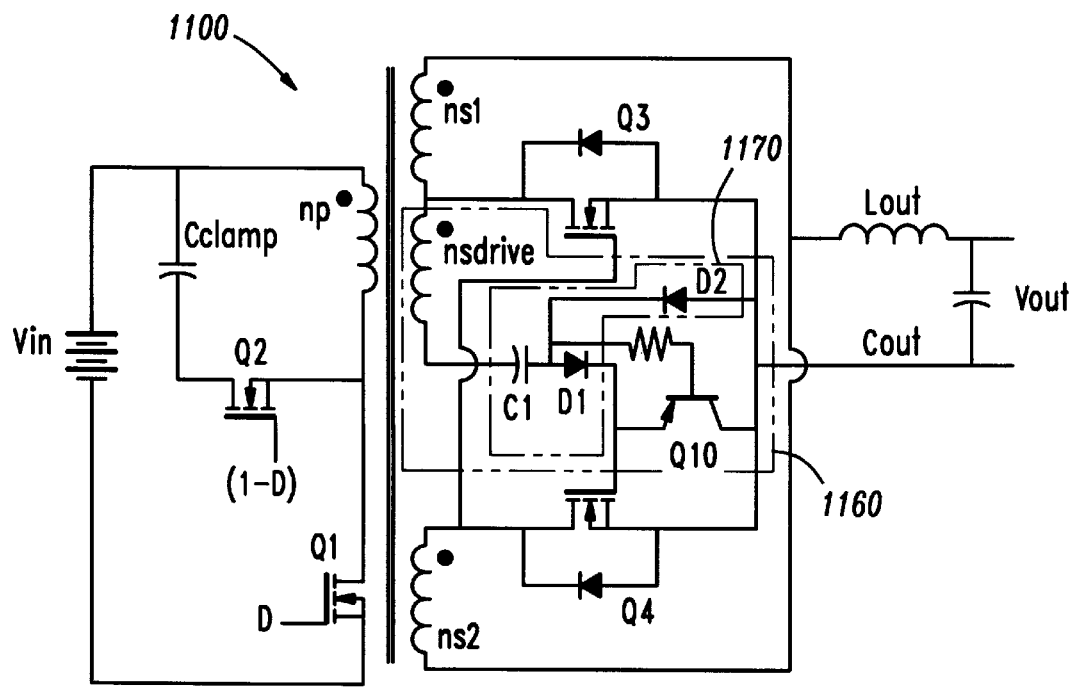
FIG. 11 illustrates another embodiment of a power converter constructed according to the principles of the present invention.

Turning now to FIG. 11, illustrated is another embodiment of a power converter 1100 constructed according to the principles of the present invention. The power converter 1100 includes an isolation transformer having a primary winding np and first and second secondary windings ns1, ns2. The power converter 1100 further includes a drive train having first and second primary side power switches Q1, Q2. The power converter 1100 further includes a synchronous rectifier, consisting of first and second rectifying switches Q3, Q4, coupled to a secondary side of the isolation transformer. The power converter 1100 is similar to the power converter 1000 of FIG. 10 and, as a result, will not be described in detail.

The power converter 1100 further includes a self-synchronizing drive circuit 1160, consisting of a drive winding nsdrive, a drive switch D1, a discharge device Q10, and a charge pump 1170. The drive winding nsdrive is series-coupled to the first secondary winding ns1 and provides a drive signal based on a voltage in the secondary side of the isolation transformer to a second control terminal of the second rectifying switch Q4. In the illustrated embodiment, the drive switch D1 is a diode and forms a portion of the charge pump 1170. Of course, the use of other types of devices for the drive switch D1 is well within the broad scope of the present invention. The discharge device Q10 is illustrated as a PNP transistor. Those skilled in the art will realize that the discharge device Q10 is not necessarily a PNP transistor and that other types of devices may also be used. In the illustrated embodiment, the charge pump 1170 consists of a capacitor C1, the drive switch D1, and a diode D2. The charge pump 1170 charges the capacitor C1 to approximately the negative potential of the drive winding nsdrive during a first time interval D. Then, during a complementary time interval 1-D, a potential across the capacitor C1 is added to the positive potential from the drive winding nsdrive. The second control terminal may thus be driven with approximately a sum of the positive and negative potentials. The discharge device Q10 then discharges the second control terminal during the first time interval D.

The charge pump 1170 thus allows the self-synchronizing drive circuit 1160 to use both the negative potential and the positive potential of the drive winding nsdrive in driving the second rectifying switch Q4. In contrast, the self-synchronizing drive circuit 1060 of FIG. 10 blocks the negative potential of the drive winding nsdrive but does not use it to advantage.

Figure 12:
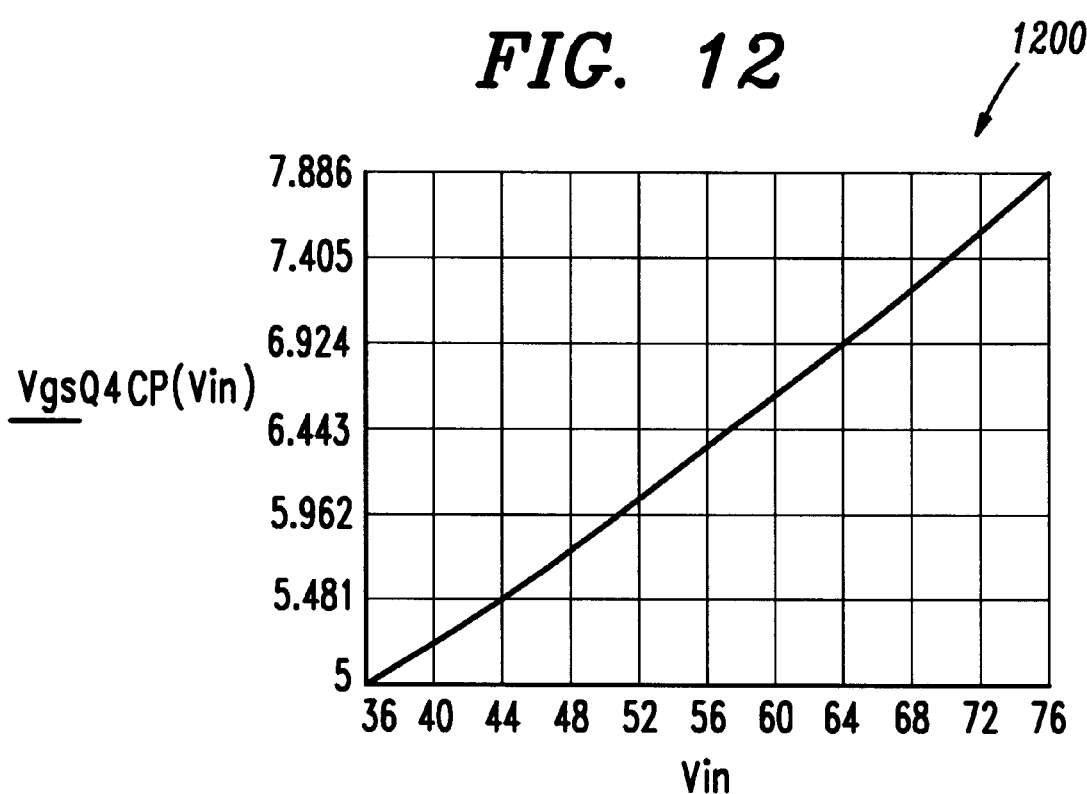
FIG. 12 illustrates an exemplary graph of the second gate drive voltage of the power converter of FIG. 11 during the first time interval.

Turning now to FIG. 12, illustrated is an exemplary graph 1200 of the second gate drive voltage VgsQ4 of the power converter 1100 of FIG. 11 during the complementary time interval 1-D. The graph 1200 assumes a drive winding nsdrive having a single turn. The charge pump 1170 thus allows the power converter 1100 of FIG. 11 to yield a drive signal with higher positive potential than the drive signal associated with the drive winding nsdrive having three turns and illustrated with respect to FIG. 9.

The charge pump 1170 also allows the second gate drive voltage VgsQ4 to be maximized at high input voltages. In comparison, the second gate drive voltage VgsQ4 illustrated with respect to FIGS. 3 and 7 are maximized at low input voltages and minimized at high input voltages. The second rectifying switch Q4 conducts for a shorter interval at low input voltages and for a longer interval at high input voltages. At high input voltages, the second gate drive voltage VgsQ4 is lower. Channel resistance is, therefore, high when the rectifying switch is on for the longest interval. If the gate voltage is variable (often an attribute of the self driven scheme) it may be more desirable to have the highest gate voltage available when the rectifying switch is conducting for the longest interval.

Figure 13:
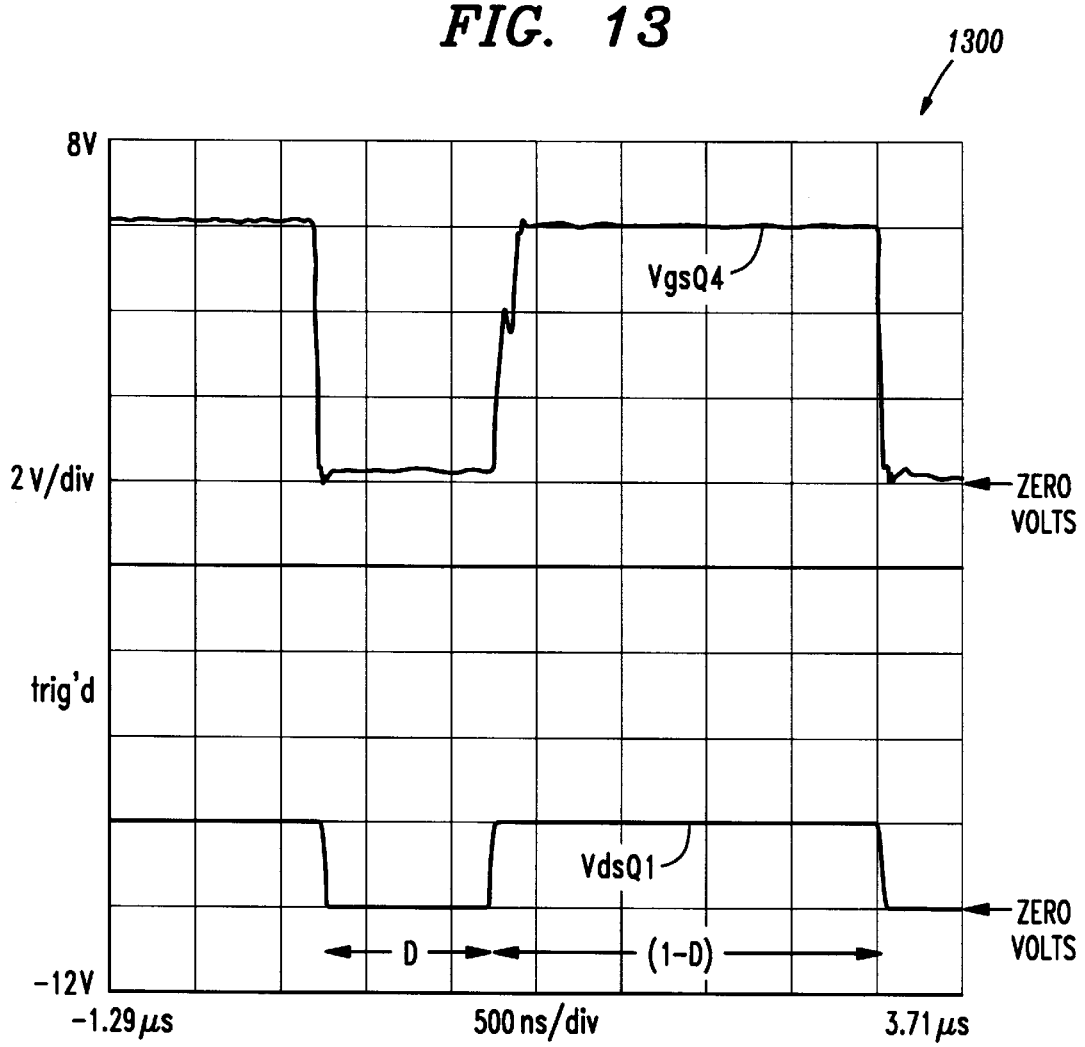
FIG. 13 illustrates an exemplary oscilloscope photograph of the second gate drive voltage and a drain to source voltage of the first power switch of the power converter of FIG. 11.

Turning to FIG. 13, illustrated is an exemplary oscilloscope photograph 1300 of the second gate drive voltage VgsQ4 and a drain to source voltage VdsQ1 of the first power switch Q1 of the power converter 1100 of FIG. 11. The charge pump 1170 enables the second gate drive voltage VgsQ4 to have a positive potential during the complementary interval 1-D, with substantially no negative potential during the first interval D.

During switching transitions, a voltage across the first and second secondary windings ns1, ns2 may decrease to about zero. Potential across the capacitor C1 may then be applied to the control terminal of the second rectifying switch Q4, thereby enhancing an overall efficiency of the power converter 1100 of FIG. 11.

The principles of the present invention may be combined with the use of voltage limiting devices to further control the potentials applied to the control terminals of the rectifying switches.. For example, voltage limiting devices may be series-coupled to the drive switch D1 of the power converters 1000 and 1100 of FIGS. 10 and 11 to provide a constant drive signal across a range of input voltages. The voltage limiting devices may also be used to control an operation of the control terminals of the rectifying switches. Voltage limiting devices are described in U.S. Pat. No. 5,274,543, entitled "Zero-Voltage Switching Power Converter with Lossless Synchronous Rectifier Gate Drive," by Loftus; U.S. Pat. No. 5,590,032, entitled, "Self Synchronized Drive Circuit for a Synchronous Rectifier in a Clamped-Mode Power Converter", by Bowman, et al.; and U.S. Pat. No. 5,303,138, entitled, "Low loss Synchronous Rectifier for Application to Clamped Mode Power Converters," by Rozman, all of which are incorporated herein by reference.

Those skilled in the art should understand that the previously described embodiments of the power converter, synchronous rectifier and self-synchronizing drive circuit are submitted for illustrative purposes only and other embodiments capable of resisting creation of a negative potential on a control terminal of a rectifying switch of the synchronous rectifier are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa. The principles of the present invention may be applied to a wide variety of power circuit topologies, including circuit topologies not employing an active clamp. Additionally, the self-synchronizing drive circuit of the present invention may be used with more than one rectifying switch in a power converter, and with power converters employing more than one drive winding (e.g., forward converter topologies employing a variety of transformer reset schemes, such as resonant reset). Also, the principles of the present invention may be applied to various half bridge, full bridge, flyback, and boost converter topologies employing discrete or integrated magnetics. For a better understanding of a variety of power converter topologies employing discrete and integrated magnetic techniques, see *Modern DC-to-DC Switchmode Power Converter Circuits*, by Rudolph P. Severns and Gordon Bloom, Van Nostrand Reinhold Company, New York, N.Y. (1985), incorporated herein by reference in its entirety.

Circuit topologies employing self driven synchronous rectifiers and which may additionally employ the present invention to advantage include, without limitation, an active clamp two transformer converter described in U.S. Pat. No. 5,291,382, entitled "Pulse Width Modulated DC/DC Converter with Reduced Ripple Current Component Stress and Zero Voltage Switching Capability," by Cohen; a hybridge, or current doubler topology described in U.S. Pat. No. 4,899,271, entitled "Power Supply Circuit," by Seiresen; and an active clamp hybridge circuit described in U.S. Pat. No. 5,434,768, entitled "Fixed Frequency Converter Switching at Zero Voltage," by Jitaru, et al.

Multiple output topologies, as described in U.S. Pat. No. 5,541,828, entitled "Multiple Output Converter With Continuous Power Transfer to an Output and With Multiple Output Regulation," by Rozman and half bridge topologies, as described in U.S. Pat. No. 5,274,543, entitle "Zero-Voltage Switching Power Converter with Lossless Synchronous Rectifier gate Drive," by Loftus may also use the present invention to advantage.

Other varieties of active clamp topologies employing self driven synchronous rectification and topologies using rectifiers other than MOSFETs (such as GaAs FETs) as described in U.S. Pat. No. 5,590,032, entitled "Self Synchronized Drive Circuit for a Synchronous Rectifier in a Clamped-Mode Power Converter," by Bowman, et al., and as described in U.S. Pat. No. 5,303,138, entitled "Low loss Synchronous Rectifier for Application to Clamped Mode Power Converters," by Rozman may use the present invention to advantage. All of the aforementioned references are incorporated herein by reference in their entirety.

Although the present invention has been described in detail, those skilled in the art should understand that they can make various changes, substitutions and alterations herein without departing from the spirit and scope of the invention in its broadest form.

What is claimed is:

1. For use with a synchronous rectifier of a power converter, a self-synchronizing drive circuit, comprising:
    a drive winding, associated with an isolation transformer of said power converter and coupled to a rectifying switch of said synchronous rectifier, that provides a drive signal based on a voltage of said isolation transformer to a control terminal of said rectifying switch to charge said control terminal of said rectifying switch synchronously with said voltage;
    a drive switch, interposed between a terminal of said drive winding and said control terminal of said rectifying switch, that periodically resists creation of a negative potential on said control terminal of said rectifying switch; and
    a discharge device, having a control terminal coupled to said terminal of said drive winding, that receives said drive signal and discharges said control terminal of said rectifying switch synchronously with said voltage.

2. The circuit as recited in claim 1 wherein said drive switch comprises a diode.

3. The circuit as recited in claim 1 wherein said drive switch forms a portion of a charge pump interposed between said drive winding and said control terminal of said rectifying switch.

4. The circuit as recited in claim 1 wherein said drive winding is located on a secondary side of said isolation transformer.

5. The circuit as recited in claim 1 wherein said discharge device is a P-channel metal oxide semiconductor field effect transistor (MOSFET).

6. The circuit as recited in claim 1 wherein said discharge device is a PNP transistor.

7. The circuit as recited in claim 1 wherein said power converter is selected from the group consisting of:
    a forward converter,
    a half-bridge converter,
    a full-bridge converter,
    a flyback converter, and
    a boost converter.

8. A method of driving a synchronous rectifier of a power converter, comprising:
    providing, with a drive winding associated with an isolation transformer of said power converter and coupled to a rectifying switch of said synchronous rectifier, a drive signal based on a voltage of said isolation transformer to a control terminal of said rectifying switch to charge said control terminal of said rectifying switch synchronously with said voltage;
    periodically resisting creation of a negative potential on said control terminal of said rectifying switch with a drive switch interposed between a terminal of said drive winding and said control terminal of said rectifying switch; and
    discharging said control terminal of said rectifying switch synchronously with said voltage with a discharge device having a control terminal coupled to said terminal of said drive winding.

9. The method as recited in claim 8 wherein said drive switch comprises a diode.

10. The method as recited in claim 8 wherein said drive switch forms a portion of a charge pump interposed between said drive winding and said control terminal of said rectifying switch.

11. The method as recited in claim 8 wherein said drive winding is located on a secondary side of said isolation transformer.

12. The method as recited in claim 8 wherein said discharge device is a P-channel metal oxide semiconductor field effect transistor (MOSFET).

13. The method as recited in claim 8 wherein said discharge device is a PNP transistor.

14. The method as recited in claim 8 said power converter is selected from the group consisting of:
    a forward converter,
    a half-bridge converter,
    a full-bridge converter,
    a flyback converter, and
    a boost converter.

15. A power converter, comprising:
    a drive train including:
        at least one primary side power switch,
        an isolation transformer coupled to said at least one primary side power switch, and
        a synchronous rectifier coupled to a secondary side of said isolation transformer and having at least one rectifying switch; and a self-synchronizing drive circuit, coupled between said isolation transformer and said synchronous rectifier, including:
- a drive winding, associated with said secondary side and coupled to said rectifying switch, that provides a drive signal based on a voltage associated with said secondary side to a control terminal of said rectifying switch to charge said control terminal of said rectifying switch synchronously with said voltage,
- a drive switch, interposed between a terminal of said drive winding and said control terminal of said rectifying switch, that periodically resists creation of a negative potential on said control terminal of said rectifying switch; and
- a discharge device, having a control terminal coupled to said terminal of said drive winding, that receives said drive signal and discharges said control terminal of said rectifying switch to an output of said power converter synchronously with said voltage.

16. The power converter as recited in claim 15 wherein said drive switch comprises a diode.

17. The power converter as recited in claim 15 wherein said drive switch forms a portion of a charge pump interposed between said drive winding and said control terminal of said rectifying switch.

18. The power converter as recited in claim 15 wherein said discharge device is a P-channel metal oxide semiconductor field effect transistor (MOSFET).

19. The power converter as recited in claim 15 wherein said discharge device is a PNP transistor.

20. The power converter as recited in claim 15 wherein said power converter is selected from the group consisting of:
- a forward converter,
- a half-bridge converter,
- a full-bridge converter,
- a flyback converter, and
- a boost converter.

* * * * *